United States Patent [19]
Reeves et al.

[11] Patent Number: 5,944,909
[45] Date of Patent: Aug. 31, 1999

[54] METHOD FOR CHEMICALLY STRIPPING A COBALT-BASE SUBSTRATE

[75] Inventors: Jim D. Reeves, Cincinnati; Howard J. Farr, Blue Ash; Warren D. Grossklaus, Jr., West Chester; Jerald M. Kauffman, Middletown; Randall L. Hobbs, Springboro; Patricia A. Charles, Hamilton; Eric C. Hemsath, Dent, all of Ohio; Scott A. Welsh, Pottstown, Pa.

[73] Assignee: General Electric Company, Cincinnati, Ohio

[21] Appl. No.: 09/017,161

[22] Filed: Feb. 2, 1998

[51] Int. Cl.$^6$ .............................. B08B 3/08; C09K 13/04; C23G 1/02
[52] U.S. Cl. .................... 134/3; 134/28; 134/38; 134/41; 252/79.2
[58] Field of Search ................... 134/3, 41, 28, 134/38; 252/79.1, 79.2

[56] References Cited

U.S. PATENT DOCUMENTS

| | | | |
|---|---|---|---|
| 3,622,391 | 11/1971 | Baldi | 134/3 |
| 4,032,359 | 6/1977 | Fisher et al. | 134/3 |
| 4,089,736 | 5/1978 | Fisher et al. | 156/665 |
| 4,274,908 | 6/1981 | Fishter et al. | 156/637 |
| 4,282,041 | 8/1981 | Cork | 134/3 |
| 4,327,134 | 4/1982 | Baldi | 427/253 |
| 4,339,282 | 7/1982 | Lada et al. | 134/3 |
| 4,425,185 | 1/1984 | Fishter et al. | 156/656 |

*Primary Examiner*—Zeinab El-Arini
*Attorney, Agent, or Firm*—Andrew C. Hess; Gerry S. Gressel

[57] ABSTRACT

A method of removing metallic compositions, such as abradable rub coatings, environmental coatings, bond coats and braze alloys, from the surface of a cobalt-base substrate, such as turbine shrouds and vanes of gas turbine engines. The method is particularly suited for the removal of nickel-base braze alloys and aluminum-containing coatings, the latter of which includes abradable MCrAlY coatings and environmentally-protective diffusion aluminide coatings. The process generally entails contacting such metallic compositions with an aqueous solution containing hydrochloric acid and nitric acid and at a solution temperature of about 130° F. to about 180° F. The solution completely removes nickel-base alloys and aluminum-containing compositions from a cobalt-base substrate without removal or damage to the underlying substrate.

20 Claims, No Drawings

5,944,909

METHOD FOR CHEMICALLY STRIPPING A COBALT-BASE SUBSTRATE

FIELD OF THE INVENTION

This invention relates to processing for stripping metallic coatings and the like from the surfaces of cobalt-base alloys, such as cobalt superalloys of the type employed to form gas turbine engine components exposed to hostile thermal and oxidizing environments. More particularly, this invention is directed to a method for rapidly removing nickel-base and aluminum-containing alloys and coatings from a cobalt-base substrate without damaging the substrate.

BACKGROUND OF THE INVENTION

The operation of axial flow gas turbine engines involves the delivery of compressed air from the compressor section of the engine to the combustion section of the engine, where fuel is added to the air and ignited. Afterwards, the resulting combustion mixture is delivered to the turbine section of the engine, where a portion of the energy generated by the combustion process is extracted by a turbine to drive the engine compressor. The turbine is contained and circumscribed by a shroud, such that the shroud is adjacent to the tips of the turbine blades. The shroud serves to channel the combustion mixture through the turbine so as to ensure that the bulk of the mixture entering the turbine drives the turbine. However, a small portion of the air is able to bypass the turbine through a radial gap present between the turbine blade tips and the shroud. Accordingly, the efficiency of a gas turbine engine is dependent in part on the ability to minimize leakage of compressed air between the turbine blades and the shroud of the engine's turbine section.

To minimize the gap between the turbine blade tips and the shroud, shrouds often undergo a final rotor grind such that the turbine rotor assembly closely matches its shroud diameter. However, manufacturing tolerances, differing rates of thermal expansion and dynamic effects limit the extent to which this gap can be reduced. Furthermore, during the normal operation of an aircraft gas turbine engine, the turbine blades may rub the shroud as a result of a hard landing or a hard maneuver of the aircraft. Any rubbing contact between the turbine blade tips and the shroud will abrade the tips, tending to further increase the gap between the shroud and turbine blade tips, thereby reducing engine efficiency. Accordingly, it is well known in the art to cover the surface of the shroud adjacent the blade tips with an abradable coating, such that the coating will sacrificially abrade away when rubbed by the turbine blades. Inherently, as the coating is removed, the gap between the blade tips and the surface of the shroud will increase, necessitating restoration of the coating in order to maintain desirable aerodynamic efficiencies associated with a smooth rub surface and a small gap between the rub surface and the turbine blades.

Various processes have been employed to restore shroud rub surface coatings. In the high pressure section of a turbine, the shroud is often a cobalt-base superalloy. Particularly suitable coatings for the abradable rub surface of a cobalt-base superalloy shroud include environmentally-resistant compositions such as MCrAlY, where M is cobalt, nickel and combinations thereof as a result of the cobalt-base superalloy substrate. A typical method of removing MCrAlY coatings from a shroud is by abrasion, e.g., grit blasting, or treatment with an acidic solution. An example of an acidic solution used in the prior art contains, by volume, about 28% ferric chloride ($FeCl_3$), about 10% phosphoric acid ($H_3PO_4$) and about 10% nitric acid ($HNO_3$), the balance water. However, this solution is very aggressive to a cobalt substrate if the treatment is not performed under strict guidelines (e.g., temperature and composition), and when properly used requires up to about twelve hours to strip an MCrAlY coating. Furthermore, the solution must be replaced at relatively short intervals to maintain its effectiveness.

Another notable shortcoming is that this solution is not effect for removing nickel-base alloys of the type often present on the shroud and other cobalt-base superalloy components of a gas turbine engine, such as nickel-base braze alloys that serve to attach cover plates, inserts, etc., to such components. As a result, removal of the braze alloy to permit refurbishment of a shroud or other cobalt-base superalloy component requires a second treatment in hot nitric acid for an extended duration, followed by a third treatment with a hot potassium permanganate ($KMnO_4$) solution. Such treatments may continue for up to forty hours or more until the cobalt-base substrate is ready for further processing, e.g., application of a new abradable coating.

Similar difficulties are encountered when processing other cobalt-base components of gas turbine engines. For example, cobalt superalloy vanes are typically protected by an environmental coating or bond coat such as a diffusion aluminide or MCrAlY. To repair the vane, such coatings must be removed, as must various inserts attached to the surface of the vane, typically with a nickel-base braze alloy. Nitric acid solutions have been successful in softening nickel-base braze alloys during the processing of cobalt superalloy vanes, but final processing requires mechanical removal of the braze alloy and insert, such as by grit blasting. However, grit blasting is very labor intensive and detrimental to the component substrate because some of the substrate is inevitably removed by the grit blasting process. With repetitive use, components stripped in the manner described above are no longer usable.

From the above, it can be appreciated that it would be desirable if a process were available for rapidly stripping a cobalt-base substrate with reduced risk to the substrate. It would be particularly desirable if such a process were capable of removing various metallic compositions, particularly aluminum-containing coatings and nickel-base compositions, from the surfaces of gas turbine engine components.

SUMMARY OF THE INVENTION

The present invention generally provides a method of removing metallic compositions, such as abradable rub coatings, environmental coatings, bond coats and braze alloys, from the surface of a cobalt-base substrate, such as turbine shrouds and vanes of gas turbine engines. The method is particularly suited for the removal of nickel-base braze alloys and aluminum-containing coatings, the latter of which includes abradable MCrAlY coatings and environmentally-protective MCrAlY and diffusion aluminide coatings. The process of this invention generally entails contacting such metallic compositions with an aqueous solution containing certain levels of hydrochloric acid (HCl) and nitric acid ($HNO_3$), and at a solution temperature of about 130° F. to about 180° F. (about 54° C. to about 82° C.). With the solution of this invention, nickel alloys and aluminum-containing compositions such as those noted above can be completely removed from a cobalt-base substrate without removal or damage to the underlying substrate. Another advantage is that the HCl—$HNO_3$ solution significantly reduces the amount of labor and time required to strip a cobalt-base substrate as compared to prior art methods. As a result, the processing and costs required to remove and repair cobalt-base components of a gas turbine engine are significantly reduced.

Other objects and advantages of this invention will be better appreciated from the following detailed description.

DETAILED DESCRIPTION OF THE INVENTION

The present invention is generally applicable to components having a cobalt-base substrate, and particularly to cobalt superalloy components. Notable examples include the high and low pressure turbine shrouds, vanes and blades of gas turbine engines. Of particular interest are high pressure turbine (HPT) shrouds and vanes, which require coatings that must be removed during refurbishment and repair of the component. For example, HPT shrouds often employ an abradable coating of typically MCrAlY which serves as a rub surface to the turbine blade tips, while HPT vanes are typically coated with a diffusion aluminide coating or a bond coat and thermal barrier coating for environmental protection. Shrouds and vanes also typically have inserts and covers that are attached by brazing with a nickel-base braze alloy. According to this invention, an improved process is provided for refurbishing such components, by which the cobalt-base substrate can be stripped of such coatings and braze alloys without incurring damage.

The method of this invention entails contacting the component with a chemical stripping solution containing hydrochloric acid (HCl), nitric acid ($HNO_3$) and water, with optional additions of nonfoaming and wetting agents. Suitable ranges for these constituents are, by volume percent, about 10% to about 30% hydrochloric acid, about 5% to about 30% nitric acid, the balance water and any optional additives. A preferred solution contains about 15% hydrochloric acid and about 15% nitric acid by volume, with the balance being water. While nitric acid and hydrochloric acid have been used alone and separately in combination with other acids and solvents for similar purposes, the ability of a solution containing both nitric acid and hydrochloric acid at their preferred levels to completely remove certain coatings from a cobalt-base substrate without etching or otherwise damaging the substrate was unknown and unforeseeable. Particularly unexpected was that at elevated temperatures, the solution of this invention becomes even more selective and controllable than at room temperature, contrary to the behavior of other stripping solutions.

The process of this invention is preferably carried out at temperatures of about 130° F. to about 180° F. (about 54° C. to about 82° C.), preferably about 150° F. (about 66° C.). Within this temperature range, nickel-base braze alloys and aluminum-containing metallic compositions can be stripped with a high level of selectivity from cobalt-base substrates in about one to three hours, with continued treatments of up to seven hours showing no measurable attack of the cobalt-base substrate. Accordingly, the chemical stripping solution of this invention has been found to be less sensitive to process variations than the more widely used prior art stripping solutions. Below the preferred temperature range, the likelihood of substrate attack increases though stripping is notably slowed, while treatment temperatures above this range significantly increase the aggressiveness of the solution though loss of potency eventually occurs from fuming.

During evaluations of this invention, HPT shrouds formed of a cobalt-base superalloy were treated with an aqueous solution of about 15% hydrochloric acid and about 15% nitric acid by volume in accordance with this invention. The superalloy was MAR-M 509, having a nominal composition, in weight percent, of about 24% chromium, about 10% nickel, about 7.5% tantalum, about 7% tungsten, about 1% iron, about 0.6% carbon and about 0.2% titanium, the balance cobalt and incidental impurities. Present on the shroud was an abradable MCrAlY rub coating having a thickness of about 0.080 inch (about 2 millimeters), and covers attached to the shroud with a nickel-base braze alloy. The HCl—$HNO_3$ stripping solution of this invention completely removed the rub coating and the braze alloy from the shroud in about 2.5 hours without measurable damage to the cobalt superalloy substrate. Advantageously, subsequent evaluations showed that about one hundred gallons (about 379 liters) of the solution were effective in treating about two hundred shrouds simultaneously, with the solution remaining effective to treat one thousand parts. As such, the HCl—$HNO_3$ stripping solution was shown not only to remove such coatings more rapidly and without damage to a cobalt-base substrate, but were also shown to have a longer life than prior art $FeCl_3$—$H_3PO_4$—$HNO_3$ stripping solutions.

During further evaluations of this invention, diffusion aluminide coatings were removed simultaneously with nickel-base braze alloy from the surfaces of HPT vanes formed of x40 cobalt-base superalloy using the same HCl—$HNO_3$ stripping solution. The diffusion aluminide coating was formed using a pack diffusion process and composition of the type disclosed in U.S. Pat. Nos. 3,415,672 and 3,540,878, assigned to the assignee of this invention. Following removal of the braze alloy and coating, inserts attached to the vanes with the braze alloy were readily removed without mechanical processing, such that the vanes were ready for repair and refurbishment. Accordingly, the prior art requirement for the vanes to be grit blasted to achieve complete removal of the braze alloy and environmental coating was completely eliminated.

While our invention has been described in terms of a preferred embodiment, it is apparent that other forms could be adopted by one skilled in the art. Accordingly, the scope of our invention is to be limited only by the following claims.

What is claimed is:

1. A method for removing a metallic composition from a surface of an article having a cobalt-base substrate without removal or damage to said substrate, the metallic composition being chosen from the group consisting of nickel-base alloys and aluminum-containing coatings, the method comprising the step of contacting the article with a solution consisting of hydrochloric acid, nitric acid, water and optionally nonfoaming and wetting agents, the solution being at a temperature of about 130° F. to about 180° F. during the contacting step.

2. A method as recited in claim 1, wherein a plurality of articles are contacted with the solution during the contacting step, each of the articles being formed of a cobalt-base superalloy and having on a surface thereof a metallic composition chosen from the group consisting of nickel-base alloys and aluminum-containing coatings, the solution simultaneously removing the metallic compositions from the surfaces of the articles.

3. A method as recited in claim 2, further comprising a second contacting step during which a second plurality of articles are contacted with the solution, each of the articles being formed of a cobalt-base superalloy and having on a surface thereof a metallic composition chosen from the group consisting of nickel-base alloys and aluminum-containing coating, the solution simultaneously removing the metallic compositions from the surfaces of the articles.

4. A method as recited in claim 1, wherein the solution consists of, in volume percent, about 10% to about 30% hydrochloric acid, about 5% to about 30% nitric acid, the balance water.

5. A method as recited in claim 1, wherein the metallic composition is a diffusion aluminide coating on the substrate.

6. A method as recited in claim 1, wherein the metallic composition is a bond coat on the substrate.

7. A method as recited in claim 1, wherein the metallic composition is a MCrAlY coating, where "M" is cobalt, nickel and combinations thereof.

8. A method as recited in claim 1, wherein the metallic composition is a nickel-base braze alloy.

9. A method for removing a metallic composition from a surface of an article having a cobalt superalloy substrate without removal or damage to said substrate, the metallic composition being chosen from the group consisting of nickel-base braze alloys and aluminum-containing environmental coatings, the method comprising the step of contacting the article with a solution consisting of about 10% to about 30% hydrochloric acid, about 5% to about 30% nitric acid, the balance water and optionally nonfoaming and wetting agents, the solution being at a temperature of about 130° F. to about 180° F. during the contacting step.

10. A method as recited in claim 9, wherein a plurality of articles are contacted with the solution during the contacting step, each of the articles being formed of a cobalt-base superalloy and having on a surface thereof a metallic composition chosen from the group consisting of nickel-base braze alloys and aluminum-containing environmental coatings, the solution simultaneously removing the metallic compositions from the surfaces of the articles.

11. A method as recited in claim 10, further comprising a second contacting step during which a second plurality of articles are contacted with the solution, each of the articles being formed of a cobalt-base superalloy and having on a surface thereof a metallic composition chosen from the group consisting of nickel-base braze alloys and aluminum-containing environmental coatings, the solution simultaneously removing the metallic compositions from the surfaces of the articles.

12. A method as recited in claim 9, wherein the solution consists of, in volume percent, about 15% hydrochloric acid, about 15% nitric acid, the balance water.

13. A method as recited in claim 9, wherein the metallic composition is a diffusion aluminide coating on the substrate.

14. A method as recited in claim 9, wherein the metallic composition is a bond coat on the substrate.

15. A method as recited in claim 9, wherein the metallic composition is an MCrAlY coating, where "M" is cobalt, nickel and combinations thereof.

16. A method as recited in claim 9, wherein the metallic composition is a nickel-base braze alloy.

17. A method for removing a metallic composition from a surface of a cobalt superalloy component of a gas turbine engine without removal or damage to said surface, the metallic composition being chosen from the group consisting of nickel-base braze alloys, diffusion aluminide coatings and MCrAlY coatings, the method comprising the step of contacting the component with a solution consisting of about 10% to about 30% hydrochloric acid, about 5% to about 30% nitric acid, the balance water and optionally nonfoaming and wetting agents, the solution being at a temperature of about 130° F. to about 180° F. during the contacting set.

18. A method as recited in claim 17, wherein the component is a high pressure turbine shroud and the metallic composition is an abradable MCrAlY coating.

19. A method as recited in claim 17, wherein the component is a high pressure turbine vane and the metallic composition is a diffusion aluminide coating.

20. A method as recited in claim 17, wherein the solution consists of, in volume percent, about 15% hydrochloric acid, about 15% nitric acid, the balance water.

\* \* \* \* \*